United States Patent [19]
Gau

[11] Patent Number: 6,085,458
[45] Date of Patent: Jul. 11, 2000

[54] LAWN EDGING

[76] Inventor: Larry J. Gau, 15701 Shadyview La., Minneapolis, Minn. 55327

[21] Appl. No.: 09/001,792

[22] Filed: Dec. 31, 1997

[51] Int. Cl.[7] .............................. A01G 1/00; E02D 27/00
[52] U.S. Cl. .................................................. 47/33; 52/102
[58] Field of Search ........................... 47/33, 46; 52/102; 404/7; D25/38

[56]         References Cited

U.S. PATENT DOCUMENTS

| | | |
|---|---|---|
| 310,421 | 8/1885 | Nauseda et al. ..................... D25/38 |
| 3,343,301 | 9/1967 | Adelman . |
| 3,537,687 | 11/1970 | Adelman . |
| 4,809,459 | 3/1989 | Brylla et al. . |
| 4,831,776 | 5/1989 | Fritch . |
| 4,846,655 | 7/1989 | Gulley . |
| 4,869,018 | 9/1989 | Scales et al. . |
| 4,934,093 | 6/1990 | Yanna . |
| 5,048,241 | 9/1991 | Gavin, Jr. . |
| 5,092,076 | 3/1992 | Terreta . |
| 5,119,587 | 6/1992 | Waltz . |
| 5,168,678 | 12/1992 | Scott, Jr. et al. . |
| 5,230,187 | 7/1993 | Reimann . |
| 5,259,154 | 11/1993 | Lilley .......................................... 47/33 |

FOREIGN PATENT DOCUMENTS 2 230 928   11/1990   United Kingdom .

*Primary Examiner*—Peter M. Poon
*Assistant Examiner*—Francis T. Palo
*Attorney, Agent, or Firm*—Patterson & Keough, P.A.

[57]          ABSTRACT

An edging member is provided. The edging member includes generally planar first and second elements and means for pivotally joining the edging member to an adjacent edging member. The first and second elements are generally transversely joined to each other. The first element is vertically oriented and the second element is horizontally oriented with the edging member is installed. A generally circular segment may be present to cover the ground below the edging member when the edging member is angularly joined to an adjacent edging member.

15 Claims, 5 Drawing Sheets

LAWN EDGING

FIELD OF THE INVENTION

This invention relates to devices used in lawn care. More specifically this invention relates to edging systems which may be advantageously used to beautify lawns and minimize lawn maintenance requirements.

BACKGROUND OF THE INVENTION

U.S. Pat. No. 4,372,079, issued to Trageser on Feb. 8, 1983, describes a garden edging structure. The garden edging structure includes an inner continuous boundary or border that surrounds the garden plot and includes a lower ground engaging portion that anchors the same about the plot. Also included is an above-ground portion that tends to confine soil of an adjacent garden plot inwardly of the inner boundary. An outer boundary or border structure is also provided and associated with the inner boundary structure. While generally providing for a lawn edging system, Trageser fails to describe a modular system which enables pivotal connection of adjacent members.

U.S. Pat. No. 4,809,459 issued to Brylla et al. on Mar. 7, 1989, describes a lawn and garden edging that is L-shaped in cross section. The edging includes a leg inserted into the ground and a flange which rests upon the ground to impede plant growth under the flange. The device of Brylla also includes an upstanding retainer section joined to the junction of the leg and flange. The retainer section is described as being useful for retaining selected above-ground garden materials into desired areas. The flange of Brylla may be slit to permit bending into curved configurations. Thus, a user must slit or otherwise modify, but not pivot, the edging of Brylla to angularly join adjacent sections.

U.S. Pat. No. 4,831,776 issued to Fritch on May 23, 1989, describes an elongated landscape edging strip formed of a flexible material. The edging strip includes an upstanding retainer portion immediate and integral with a thin gauge, readily deformable mowing strip, and a thin gauge readily deformable anchoring strip. The edging apparatus of Fritch also includes C-shaped and insert connectors to join adjacent pieces. Corner sections are used to join pieces at corners. Thus, adjacent sections may not be pivotally joined.

U.S. Pat. No. 4,934,093 issued to Yanna on Jun. 19, 1990, describes landscape edging. The landscape edging comprises a generally planar member, an interior flange generally parallel to the plane of the member extending along a first portion thereof, and an exterior flange generally parallel to the plane of the member and extending along a second portion thereof. The member further includes a contiguous raised wall projecting generally perpendicular to the plane of the member, the wall being interposed between the interior and exterior flanges of the member and extending along the length of the member. The edging of Yanna is not modular, thus adjacent, pieces may not be pivotally joined.

U.S. Pat. No. 5,048,241, issued to Gavin on Sep. 17, 1991, describes a lawn edging apparatus. The lawn edging apparatus includes a first shield with a first J-shaped end mounted within a second J-shaped end of a second shield to permit relative pivoting of the first shield relative to the second shield. The J-shaped end of the second shield is of a complimentary configuration and is slidably receivable within the first J-shaped end. This particular apparatus is not modular. Thus, adjacent sections cannot be pivotally joined.

U.S. Pat. No. 5,092,076, issued to Terreta on Mar. 3, 1992, describes a planter edging landscaping system. A first embodiment of the planter edging landscaping system includes a planter wall edging member which may be installed along wall structures or the like to create a planter area as well as to provide an edging lip for ease of grass trimming or shearing. In a second embodiment, the planter edging landscaping system of Terreta includes a flexible wall structure which is combinable with an edging cap to create an edging system which is adaptable to varying terrain. As with the above-discussed patents, the edging members of Terreta cannot be pivotally adjoined.

Thus, there is a need for an edging system which includes a plurality of edging members joinable at varying angles and which suppress the growth of vegetation proximate a vertical surface of the edging when anchored in place.

SUMMARY OF THE INVENTION

The need for an edging system is substantially met by the present invention as described hereinbelow.

An edging member is provided. The edging member may include a generally planar first element, a generally planar second element, means for pivotally connecting the edging member to an adjoining edging member, and means for anchoring the edging member to the ground. The rear edge of the second planar element may be affixed to a bottom edge of the first planar element. The means for pivotally connecting the edging member to an adjoining edging member may be affixed to an outboard portion of the first element. The means for anchoring the edging member to the ground may be functionally proximate the second element. The second planar element may further comprise an extension proximate a lateral edge thereof. The extension may radially extend from the pivotal connecting means. The pivotal connecting means may include at least one pivoting element selected from the group consisting of a female pivoting element, a male pivoting element, and a female pivoting element and a male pivoting element. The pivotal connecting means may include a cylindrical element, the cylindrical element defining a bore. The pivotal connecting means may include a pivoting element disposable within the aforementioned bore. The anchoring means may include an anchoring element extendible into the ground beneath the second planar element. The anchoring element may include a shaft. The anchoring element may also include a plurality of splines extending from the shaft. The anchoring element may further include a head. The anchoring member may be accommodated by an opening defined in the second planar element. The anchoring element may also be unitary with the second planar element. The edging member may be unitary. The edging member may further include reinforcing means proximate the first and second elements.

There is also provided a method of installing an edging system along a desired location. The method may include the steps of: (1) providing a first edging member, the first edging member including any feature described hereinabove; (2) placing the second element of the first edging member proximate the ground at a first desired site; and (3) anchoring the first edging member proximate the ground using said anchoring means.

The method of installing an edging system may further include the steps of: (1) providing a second edging member, the second edging member including any feature described hereinabove; (2) placing the second element of the second edging member proximate the ground at a second desired site; (3) interconnecting the pivotal connecting means of the first and second edging members; and (4) anchoring the second edging member proximate the ground using said anchoring means.

DETAILED DESCRIPTION OF THE DRAWINGS

Comprehension of the present invention may be gained through reference to the drawings in conjunction with a thorough review of the following explanation. In order to facilitate a full appreciation of the invention, an overview of an exemplary embodiment is initially provided. The overview is followed by a more detailed explanation.

Figure 1:
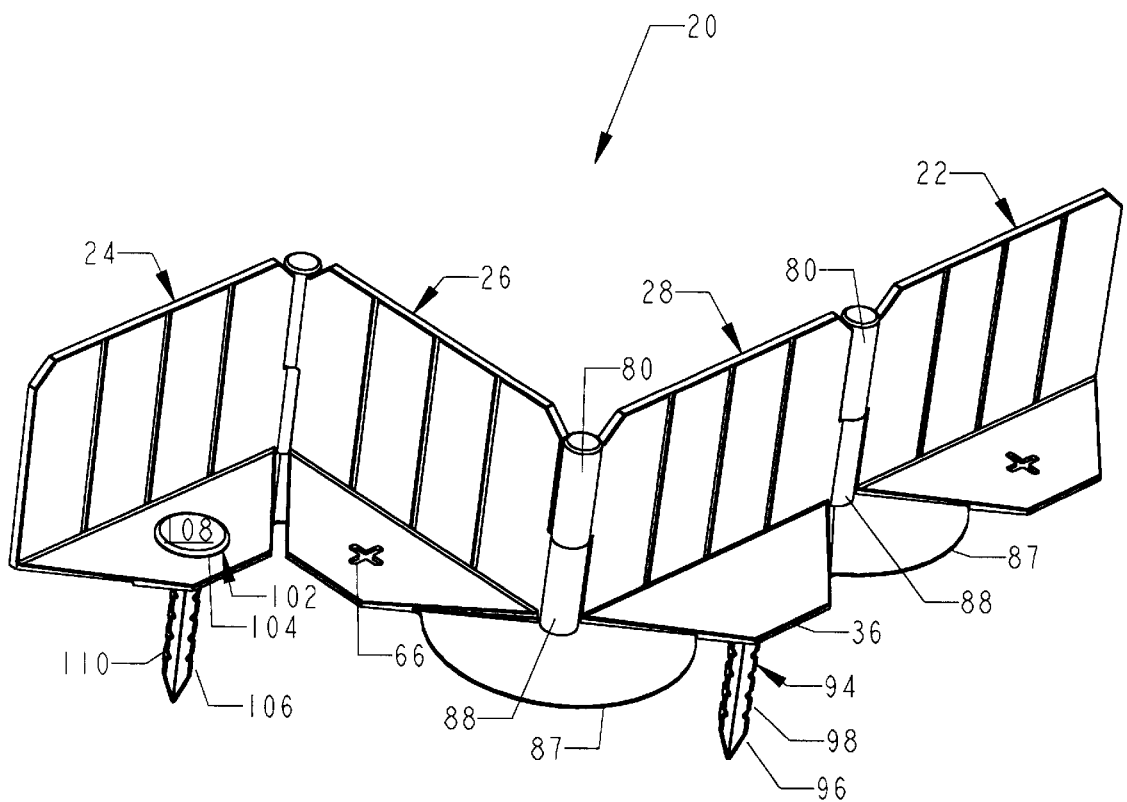
FIG. 1 is a perspective view of an assembled edging system of the present invention.

Referring to FIG. 1, exemplary edging system 20 may include a plurality of cooperatively coupled edging members to define an elongate edge. The edging members may include a right end edging member 22, left end edging member 24, first interior edging member 26, and second interior edging member 28 in a cooperatively coupled relationship. Members 22–28 are advantageously interconnected proximate an edge of a lawn. Edging system 20 is especially advantageous when positioned on the border of a lawn and a tilled area such as a garden. As can be seen from the following explanation, lawn edging system 20 may serve to inhibit encroachment of grass into areas in which the grass is not desired. Moreover, edging system 20 enables a person to more efficiently maintain an adjacent lawn. More efficient maintenance is due in part to the fact that grass proximate edging system 20 need not be hand trimmed.

Figure 2:
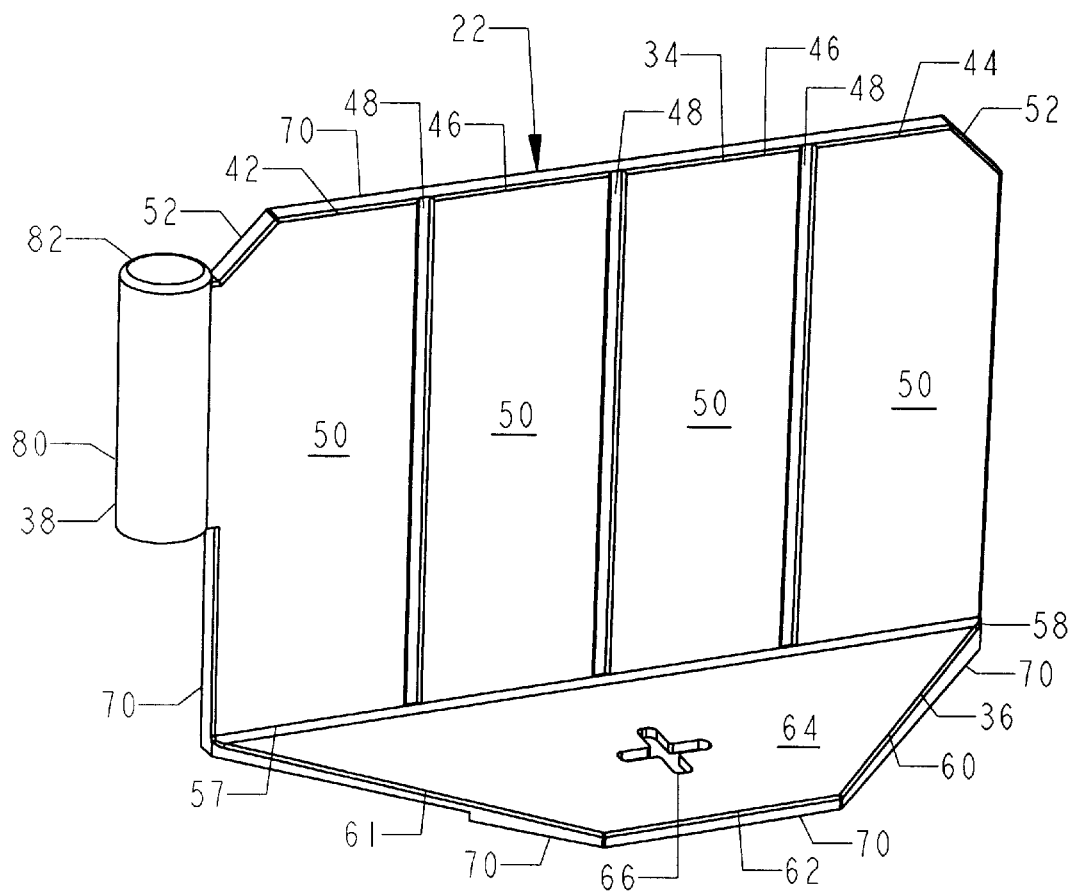
FIG. 2 is a perspective view of a right end edging member.

For descriptive purposes, members 22–28 will be described as including a number of elements. Referring to FIG. 2, right end edging member 22 includes generally planar vertical element 34, generally planar horizontal element 36, and left connector 38. Vertical element 34 may be further envisioned as including left lateral panel 42, right lateral panel 44, and one or more interior panels 46. Separating adjacent panels 42–46, are generally vertical grooves 48. Each panel 42–46 displays front surface 50. Proximate each groove 48 is a rib extending from the rear surface of vertical element 34 (not shown). A bevel 52 may be present proximate a junction between an upper edge and an outboard edge of left and right lateral panels 42, 44.

Horizontal planar element 36 extends generally transversely from lower edge 57 of vertical element 34. Horizontal element 36 displays rear edge 58, a pair of lateral edges 60, 61, front edge 62, and upper surface 64. Rear edge 58 generally coextends with lower edge 57 of vertical element 34. In this embodiment, front edge 62 is approximately one-third the length of rear edge 58. Thus, lateral edges 60 bevel from rear edge 58 to front edge 62. Horizontal element 36 defines opening 66 in a central portion thereof. Opening 66 may be envisioned as a pair of intersecting slots. Lip 70 extends generally rearwardly from peripheral portions of vertical element 34 and from lateral edge 60, front edge 62, and a forward portion of lateral edge 61.

Left connector 38 includes cylindrical element 80. Cylindrical element 80 defines bore 82 therein. Left connector 38 is disposed proximate an upper portion of an outboard edge of left lateral panel 42. Connector 38 includes a first portion of a hinge with an adjacent edging member.

Figure 3:
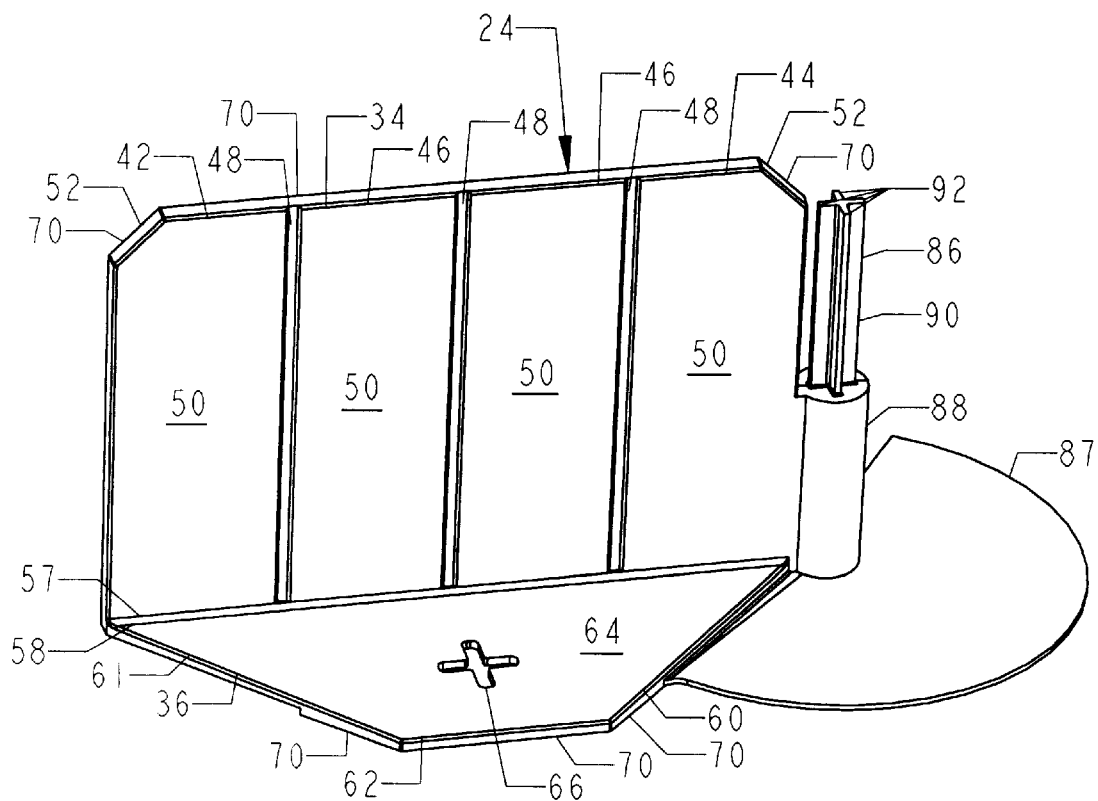
FIG. 3 is a perspective view of a left end edging member.

Referring to FIG. 3, vertical and horizontal elements 34, 36 included in left end edging member 24 are similar to those of right end edging member 22 in this embodiment. In addition to vertical and horizontal elements 34, 36, left member 24 includes right connector 86 and circular segment 87. Connector 86 comprises a second portion of a hinge in cooperation with the first hinge portion of connector 38 of an adjacent edging member. Right connector 86, in turn, includes cylindrical element 88 and upper element 90. Cylindrical element 88 is unitary to a lower portion of an outboard edge of panel 44 in this embodiment and extends from an upper surface of cylindrical element 88. Element 90 includes four connector splines 92. Exemplary circular segment 87 is generally semi-circular in confirmation and extends radially from a lower portion of cylindrical element 88. An inboard edge 91 of circular segment 87 may coextend with a portion of the lower edge of peripheral lip 70 proximate lateral edge 60.

Figure 4:
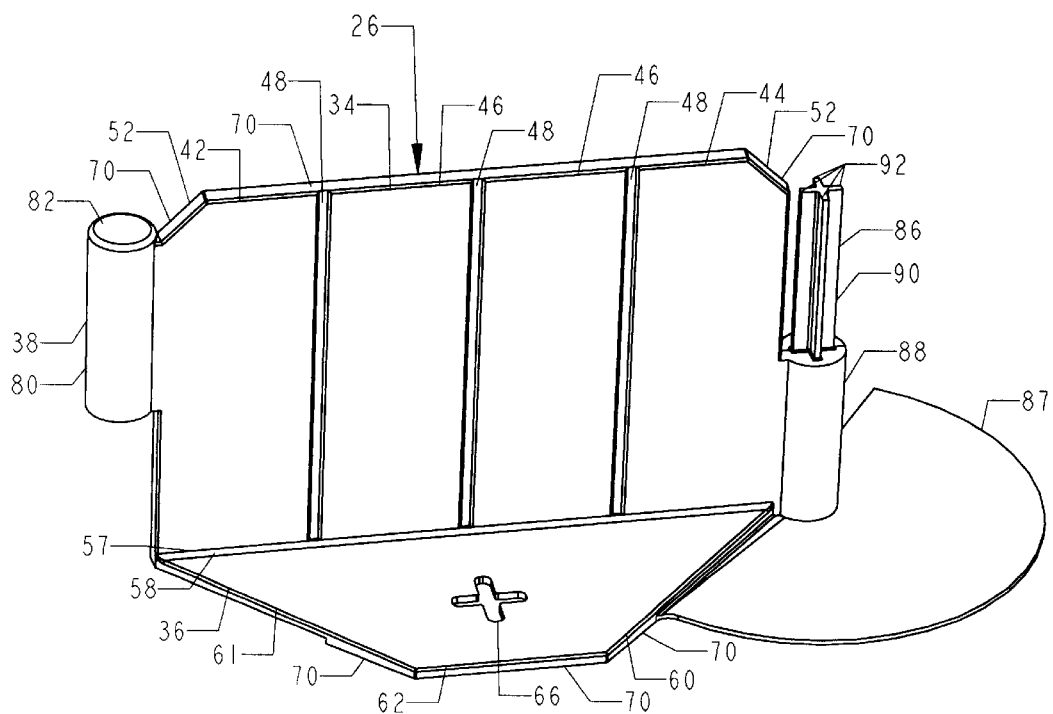
FIG. 4 is a perspective view of a first embodiment of an interior edging member.

Referring to FIG. 4, exemplary first interior edging member 26 includes vertical and horizontal elements 34, 36, left connector 38, right connector 86, and circular segment 87.

As seen in FIG. 1, exemplary second interior edging member 28 is generally identical to first interior edging member 26, except that opening 66 is not defined in horizontal element 36. Rather unitary anchoring element 94 extends from a lower surface of horizontal planar element 36. Exemplary unitary anchoring element 94 includes shaft 96. A plurality of anchoring splines 98 extend from shaft 96.

Figure 5:
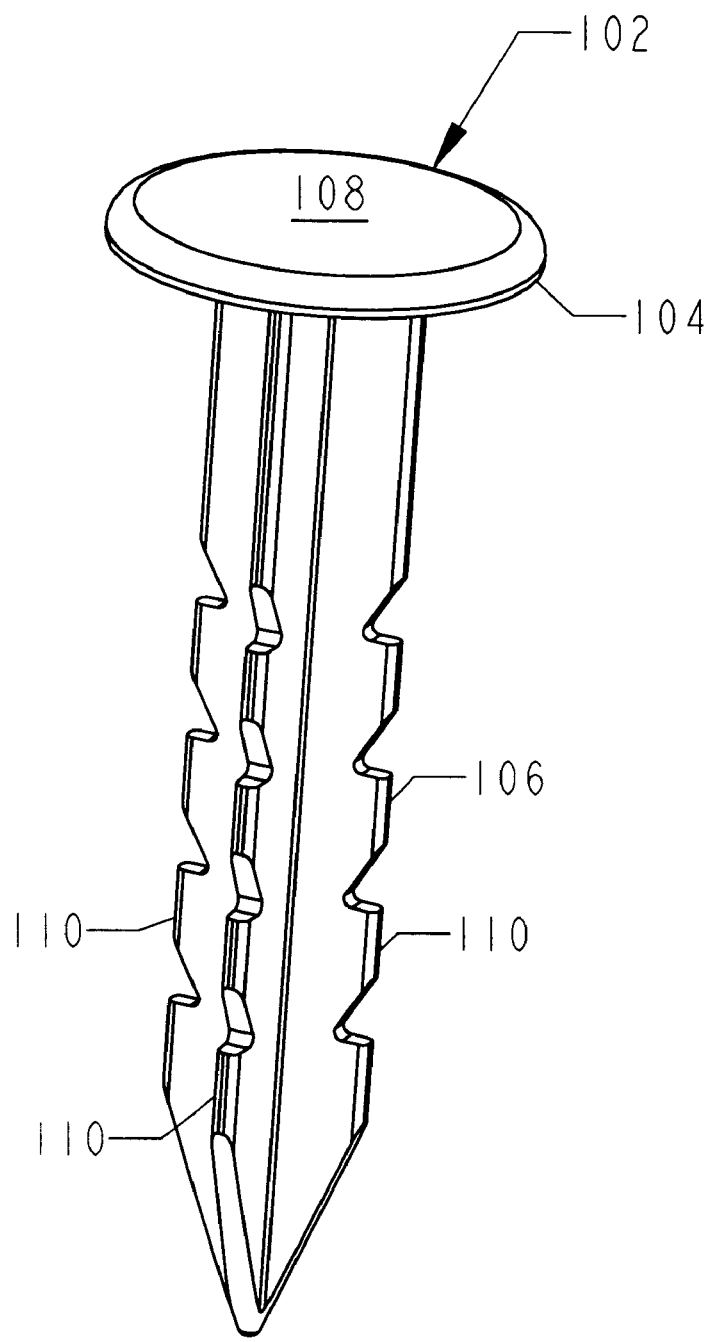
FIG. 5 is a perspective view of an anchoring element.

Exemplary anchoring element 102 is depicted in FIG. 5 and includes head 104 and shaft 106. In this embodiment, head 104 is generally circular and displays upper surface 108. Exemplary shaft 106 extends from a lower surface of head 104. Shaft 106 includes four splines 110. Splines 110 are configured such that shaft 106 may be accommodated within opening 66.

Members 22–28 may be made by injection molding, using a polymer blend of resilient materials such as polyethylene terephthalate (PET) and polycarbonate.

In this embodiment, vertical planar element 34 is about 16.5 cm wide and about 10.4 cm high. Horizontal planar element 36 is about 4.5 cm in depth, and front edge 62 is about 5.5 cm in length. Bore 82 has a diameter of about 1.5 cm and cylindrical element 80 is about 7.5 cm in length. Cylindrical element 88 is about 1.5 cm in length. Upper element 90 is about 6 cm in length and has a diameter of about 1.3 cm at an upper end thereof. Circular segment 87 has a diameter of about 14 cm.

In use, a border between, for instance a lawn and a garden, is selected. Left end edging member 24 is emplaced at a desired location. Anchoring element 102 is extended through opening 66 in horizontal element 36 and pushed into the ground below. First or second interior edging members 26, 28 are then sequentially emplaced adjacent left member 24. Left connector 38 is slidingly disposed about right connector 86, the upper element 90 of connector 86 being rotatably disposed in bore 82 of connector 38 to form the hinge between the respective edging members 26, 28. Horizontal element 36 is emplaced proximate the ground at the desired site. Members 26, 28 may be pivoted relative to each other or to left member 24 until a desired angle is obtained. In being pivoted, circular segment 87 disposes under a portion of edge 61 rearward of lip 70, thereby interleaving with horizontal element 36 of adjacent edge member 22–28 to define a generally continuous ground cover proximate vertical elements 34 of edge members 22–28. This enables an emplaced edging system 20 to completely cover the ground therebelow, regardless of the relative angles of members 22–28. This ground cover effect substantially eliminates the growth of vegetation on one side of vertical elements 34 proximate thereto, along the full length of edging system 20. Alternatively, second interior edging member 28 may be utilized. If so, left connector 38 is disposed about right connector 86 and integral anchoring element 94 is pressed into the ground simultaneously. Right end edging member 22 may be emplaced as the last member in edging system 20. Right member 22 is emplaced as described above with respect to members 22, 26–28.

Numerous modifications may be made of this invention without departing from the spirit thereof. Thus, the scope of the invention is not to be limited to the embodiments illustrated and described but is to be determined by appended claims and their equivalents.

What is claimed is:

1. An edging member comprising:
    a generally planar first element including a lower edge with a length;
    a generally planar second element disposed generally transverse to the first element and including a rear edge with a length substantially equal to the length of the lower edge of the first element;
    hinge means operably coupled to the first element for pivotally connecting the edging member to an adjoining edging member; and
    means for anchoring the edging member to the ground, said anchoring means being operably coupled to the second element.

2. The second planar element of claim 1, in which the extension radially extends from the pivotal connecting means.

3. The edging member of claim 1, in which the hinge means includes at least one pivoting element selected from the group consisting of a female pivoting element, a male pivoting element, and a female pivoting element and a male pivoting element.

4. The edging member of claim 1, in which the hinge means includes a cylindrical element defining a bore.

5. The edging member of claim 1, in which the hinge means includes a pivoting element.

6. The edging member of claim 1, in which the anchoring means includes an anchoring element, the anchoring element extendible into the ground beneath the second planar element.

7. The edging member of claim 6, in which the anchoring element includes a shaft.

8. The edging member of claim 7, the anchoring element further including a plurality of splines extending from the shaft.

9. The edging member of claim 8, the anchoring element further including a head, the anchoring member being accommodated by an opening defined in the second planar element.

10. The edging member of claim 6, in which the anchoring element is unitary with the second planar element.

11. The edging member of claim 1, in which said edging member is unitary.

12. The edging member of claim 1, further comprising reinforcing means proximate the first and second elements.

13. A method of installing an edging system along a desired location, comprising the steps of:

providing a first edging member including
    a first generally planar element and a second generally planar element, the first element including a lower edge with a length, the second element including a rear edge with a length substantially equal to the length of the lower edge of the first element, and the rear edge of the second planar element being affixed to the bottom edge of the first planar element,
    means for pivotally connecting the edging member to an adjoining edging member, said pivotal connecting means affixed to said first element, and
    means for anchoring the edging member to the ground, said anchoring means functionally proximate the second element;
placing the second element of the first edging member proximate the ground at a first desired site; and
anchoring the first edging member proximate the ground using said anchoring means.

14. The method of claim 13, further comprising the steps of:

providing a second edging member including
    a first generally planar element and a second generally planar element, the rear edge of the second planar element affixed to a bottom edge of the first planar element,
    means for pivotally connecting the edging member to an adjoining edging member, said pivotal connecting means affixed to said first element, and
    means for anchoring the edging member to the ground, said anchoring means functionally proximate the second element;
placing the second element of the second edging member proximate the ground at a second desired site;
interconnecting the pivotal connecting means of the first and second edging members; and
anchoring the second edging member proximate the ground using said anchoring means.

15. An edging system, comprising:
    a first edge member comprising generally planar upright and ground covering elements, at least one hinge portion and anchoring means, the ground covering element extending generally transversely from a bottom edge of the upright element, the hinge portion disposed proximate a lateral edge of the upright element,
    a second edge member comprising generally planar upright and ground covering elements, at least one hinge portion, and anchoring means, the ground covering element extending generally transversely from a bottom edge of the upright element, the hinge portion disposed proximate a lateral edge of the upright element,
    said second edge member hinge portion conformed to pivotally couple to said first member hinge portion such that said first and second edge member ground covering elements and said first and second edge member hinge portions cooperate to define a substantially continuous ground cover when said second edging member is pivoted in a 180° arc relative to said first edging member.

* * * * *